May 10, 1966  YOSHIHISA MAITANI  3,250,195
VIEWFINDER FOR SINGLE-LENS REFLEX CAMERA
Filed Feb. 17, 1964
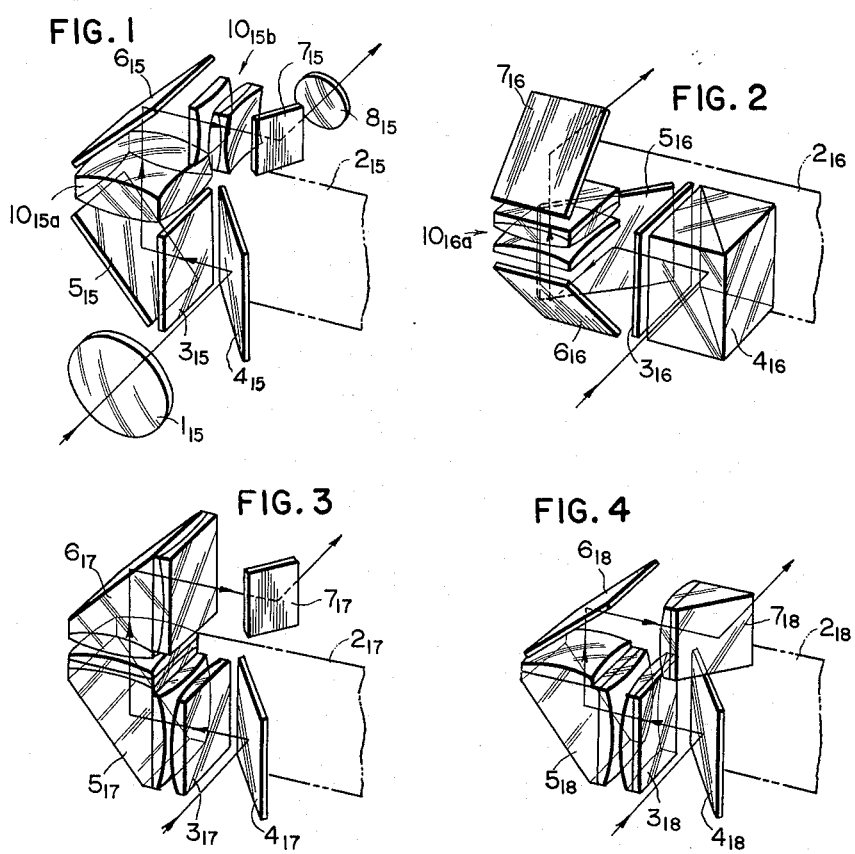

United States Patent Office 3,250,195
Patented May 10, 1966

3,250,195
VIEWFINDER FOR SINGLE-LENS REFLEX CAMERA
Yoshihisa Maitani, Tokyo, Japan, assignor to Olympus Kogaku Kogyo Kabushiki-Kaisha, Tokyo, Japan
Filed Feb. 17, 1964, Ser. No. 345,296
Claims priority, application Japan, Feb. 19, 1963, 38/8,341
3 Claims. (Cl. 95—42)

This invention relates to improvements in a viewfinder for a single-lens reflex camera including a focussing screen disposed within a camera housing perpendicularly to a plane of a photographic film to be loaded in the camera and having a line of intersection along which an extension of a first reflecting mirror intersects the plane of the film widthwise of the film, an eyepiece, and three reflecting plane disposed between the focussing screen and the eyepiece to produce an erect image.

In the type of viewfinder as above described, an optical element for reflecting an image formed on the focussing screen within the camera housing is disposed laterally of and on that side of an optical axis of a photographic objective opposite to the focussing screen. For this reason, such a type of viewfinders is particularly suitable for use in small-sized photographic cameras including a film window relatively small in transverse dimension, for example, photographic cameras for taking on a length of 35 mm. wide perforated photographic film pictures corresponding in size to one standard frame presently used in the field of motion picture art. However, as one frame on the film in which a picture is taken has a small area, an eyepiece of a viewfinder is required to have a high magnification. In addition, if the viewfinder used includes four reflecting planes for producing an erect image then its optical path will be generally long. This leads to the difficulty of designing an eyepiece having a high magnification.

Accordingly, the main object of the invention is to eliminate that difficulty.

With the above object in view, the invention is characterized in that an optical system constituting the viewfinder referred to has at least one air gap into which an optical, plane parallel plate, prism or convergent lens made of a glass or synthetic resin is inserted.

The invention will become more readily apparent from the following detailed description taken in conjunction with the accompanying drawings in which:

FIGS. 1 through 4 show perspective views of embodiments of the invention using a dioptrically positive lens disposed on one portion of a viewfinder system.

In one embodiment of the invention illustrated in FIG. 1, a photographic objective $1_{15}$ is arranged to focus an object (not shown) to be photographed onto an exposed surface of a photographic film $2_{15}$ adapted to be normally taken up transversely of a camera housing (not shown). In order to reflect light from the object passed through the photographic objective $1_{15}$ toward a focussing screen $3_{15}$ positioned in a direction perpendicular to the direction of the width of the film within the housing, a movable, totally reflecting mirror $4_{15}$ is disposed at a position where the same bisects an angle formed between the planes of the film and the focussing screen. At the time of an exposure operation, the reflecting mirror $4_{15}$ can be swung to a position where it is parallel to the plane of the focussing screen. The image for the object formed on the focussing screen $4_{15}$ is successively reflected from three stationary, totally reflecting mirrors $5_{15}$, $6_{15}$ and $7_{15}$ toward an eyepiece $8_{15}$ provided above the camera housing. A dioptrically positive lens $10_{15a}$ made of a glass is disposed between the mirrors $5_{15}$ and $6_{15}$ to bisect an angle therebetween.

In FIGS. 2 through 4, the photographic objective and the eyepiece have been omitted for the sake of clarity.

A composite dioptrically positive lens $10_{15b}$ is disposed between the third and fourth reflecting mirrors.

An optical path shown in FIG. 2 has a rectangular prism $4_{16}$ in place of mirror $4_{15}$ and plate-like reflecting mirrors $6_{16}$ and $7_{16}$ reflect from the horizontal to the vertical and then to the horizontal and have dioptrically positive lens $16a$ disposed therebetween.

An arrangement shown in FIG. 3 has the same optical path as that illustrated in FIG. 1 excepting that the mirrors $5_{15}$ and $6_{15}$ shown in FIG. 1 are replaced by a pair of rectangular prisms $5_{17}$ and $6_{17}$ disposed one above another and including an entrance and an exit plane respectively each having a dioptrically positive lens cemented thereto. Further a focusing screen $3_{17}$ is positioned on a flat surface of a plano-convex lens.

An optical path shown in FIG. 4 is the same as in FIG. 3 excepting that the rectangular prism $6_{17}$ having the lenses cemented to the entrance and exit planes thereof is replaced by a plate-like mirror $6_{18}$ and that the plate-like mirror $7_{17}$ shown in FIG. 3 is replaced by a rectangular prism $7_{18}$ having a dioptrically positive lens cemented on the entrace plane thereof.

The invention is advantageous in that an eyepiece used in a viewfinder is possible to be easily designed that an image which an operator can observe in the view field of the eyepiece can be magnified.

While the invention has been described in conjunction with the certain preferred embodiments thereof it is to be understood that numerous changes and modification may be resorted to without departing from the spirit and scope of the invention.

What I claim is:

1. A viewfinder system for use in a single lens reflex camera having a housing with means therein to move a film in a plane along said housing and having a focusing screen in a plane perpendicular to the plane of the film, and a movable reflecting surface bisecting the angle between the film plane and the focusing screen and movable to a position parallel to the focusing screen and out of the path of the image beam to the film, said viewfinder comprising an eyepiece, three reflecting surfaces disposed between said eyepiece and the focusing screen and reflecting an image from the focusing screen to the eyepiece so that the image is erect at the eyepiece, one surface being adjacent the eyepiece, one being intermediate and the third being remote from the eyepiece, and a dioptrically positive lens system disposed along the optical axis of said reflecting surfaces and said eyepiece and between the reflecting surface adjacent said eyepiece and the next reflecting surface for magnifying the image between said last mentioned reflecting surfaces.

2. A viewfinder system as claimed in claim 1 and further comprising an auxiliary dioptrically positive lens disposed between the remote reflecting surface and the focusing screen.

3. A viewfinder system as claimed in claim 1 and further comprising an auxiliary dioptrically positive lens disposed between the intermediate and remote reflecting surfaces.

References Cited by the Examiner
UNITED STATES PATENTS

| | | | |
|---|---|---|---|
| 2,284,562 | 5/1942 | Dittmann | 95—42 |
| 2,513,861 | 7/1950 | Harrott | 95—42 |
| 2,526,204 | 10/1950 | Dodin | 95—42 X |

JOHN M. HORAN, *Primary Examiner.*